Dec. 17, 1929.   F. H. VAN HOUTEN   1,740,049
DOUGH DIVIDER
Filed Dec. 21, 1927   2 Sheets-Sheet 1

INVENTOR.
F. H. Van Houten,
BY
his ATTORNEYS

INVENTOR.
F. H. Van Houten,
BY
ATTORNEYS

Patented Dec. 17, 1929

1,740,049

UNITED STATES PATENT OFFICE

FRANK H. VAN HOUTEN, OF BEACON, NEW YORK, ASSIGNOR TO DUTCHESS TOOL COMPANY, OF BEACON, NEW YORK, A CORPORATION OF NEW YORK

DOUGH DIVIDER

Application filed December 21, 1927. Serial No. 241,592.

This invention relates to improvements in dough handling machinery and particularly to the type of apparatus known as automatic dough dividers.

Dough dividers generally embody a dividing head which has a plurality of pockets for receiving more or less definite quantities of dough from the hopper of the divider, this head being slidable from its dough receiving position to a discharging position where the dough in the pockets is ejected onto a traveling belt by which it is carried to other apparatus.

For ejecting the dough from the pockets each of the latter have a plunger slidably mounted therein and it is highly desirable that these plungers be connected together in order to insure uniform action. One object of the present invention, therefore, is to provide a dividing head in which the plungers of the several pockets are connected together and operate as a unit.

Dough passing from the hopper to the pockets of the dividing head first moves from the hopper into a compression box immediately below the hopper from which it is afterwards pressed by a piston into the pockets. It has been found that the dough while confined in the compression box is more firmly compressed at the sides of said box and in dividers having a dividing head with, say, four pockets, it has been found that the two outside pockets must be made uniformly smaller than the two center pockets in order to compensate for the different degrees of compression exerted on the dough and thus insure uniform quantities of dough being pressed into all of the pockets. In view of this a further object of the present invention is to provide means whereby the ejecting plungers may be retracted in their respective pockets different distances, that is, in a head having four pockets the two plungers of the two center pockets will be retracted a greater distance than the two outside pockets, whereby the quantity of dough compressed in the two center pockets will be substantially the same as the quantity deposited in the two outside pockets notwithstanding the fact that the dough in the two outside pockets has been placed under greater compression than that in the two inside pockets. In this respect the present invention might be said to contemplate a simplification of the mechanism disclosed in applicant's co-pending application Serial No. 124,021, now Patent No. 1,703,126, granted Feb. 26, 1929.

With these and other objects in view, the invention consists in certain novel details of construction and combinations and arrangements of parts all as will be hereinafter more fully described and the novel features thereof particularly pointed out in the appended claims.

In the accompanying drawings:—

Fig. 5 is a series of views illustrating more or less diagrammatically the adjustable connections for obtaining a differential movement of the several plungers for the pockets in the dividing head.

Fig. 6 is a detail sectional view of one of said adjustable connections for the plungers.

Figure 1:
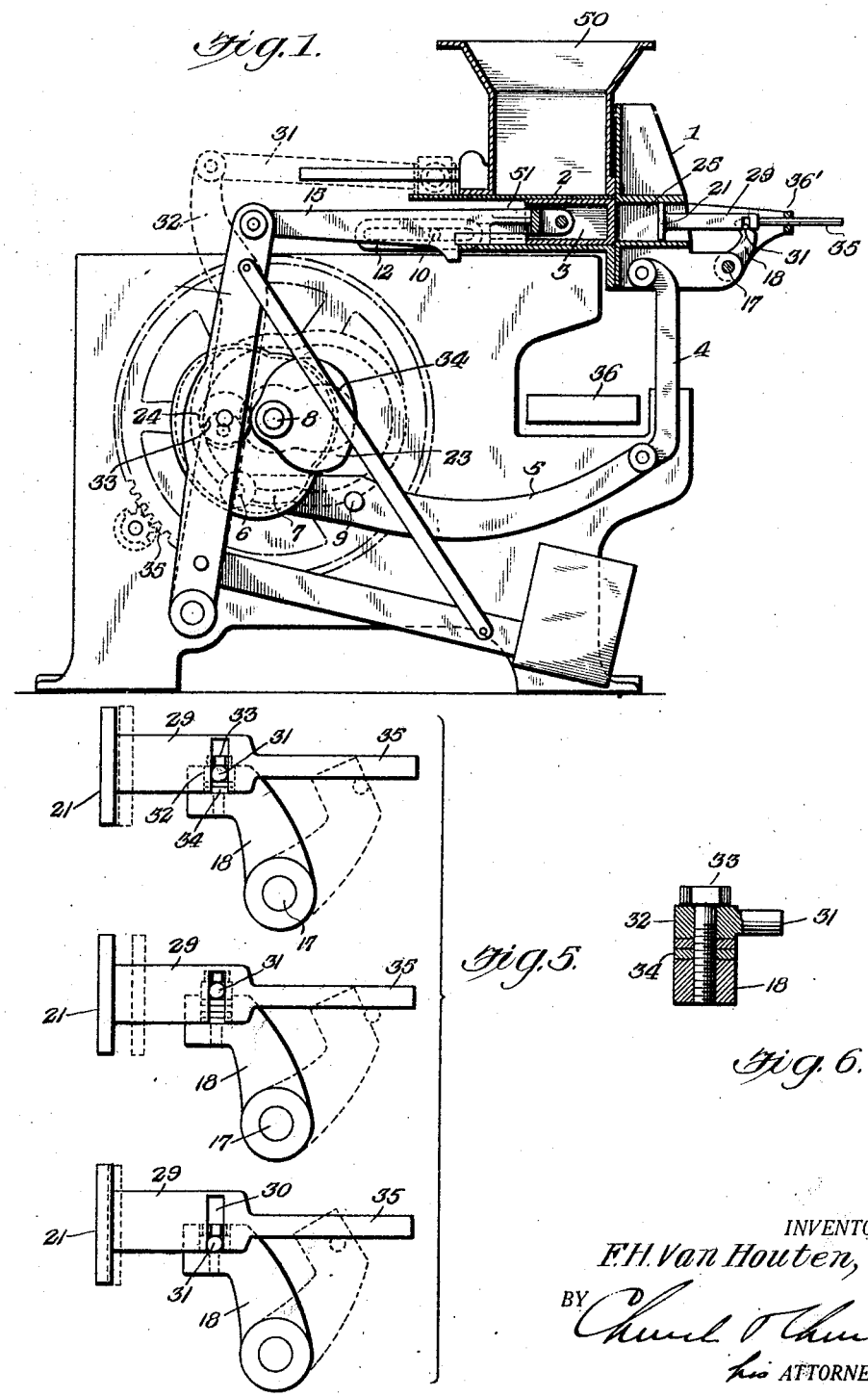
Figure 1 is a side elevational view of a dough divider embodying the present improvements.

The batch of dough to be divided is deposited in the hopper 50 of the machine and when the sliding knife 2 and piston 3 are retracted from the positions shown in Fig. 1 the dough is fed into the space below the hopper, this space 51 being termed the compression box. The knife 2 is retracted by the link 31 which is connected to the lever 32, the said lever being pivoted on the frame of the machine and carrying a cam roller 33 which engages the cam 34, said cam being a part of the driving gear 35. The piston 3 is actuated by the lever 15 connected to the lever 22 pivoted on the main frame and having a cam roller 24 which engages the cam 23 which is also driven by the driving gear 35. These driving connections will be found on standard machines heretofore furnished the trade and as they form no part of the present invention they are simply shown in outline and it is believed that this general description will suffice for present purposes. After the knife and piston have been retracted and a quantity of dough has passed down into the compression box 51 continued movement of the cams 23 and 34 causes the knife and piston to be returned to the positions shown in Fig. 1, whereupon the dough in the compression box will be pushed by the piston into the pockets 25 in the dividing head 1. It should be stated that the relative positions of the cams 23 and 34 is such that the knife 2 starts to move forward and is followed by the piston 3, knife 2 being first moved all the way across the bottom of the hopper after which the piston 3 continues to move forward, pressing the dough into the pockets. The bottoms of the pockets are formed by the plungers 21 and after the dough has been thus deposited in the pockets the dividing head 1 is moved downwardly to the position shown in Fig. 4 whereupon the plungers 21 are reciprocated in the pockets toward the mouths of said pockets for the purpose of ejecting the dough on to the traveling belt 36 which delivers the lumps of dough thus ejected from the pockets to other apparatus for further treatment. The mechanism for actuating the plungers 21 will be later described but for moving the dividing head from the position shown in Fig. 1 to the position shown in Fig. 4 and back again to its horizontal position for again receiving dough from the compression box there is a lever 5 supported on a shaft 9 in the main frame of the machine, said head being connected at one end by a link 4 to the dividing head and at its opposite end provided with a cam roller 6 which engages the cam 7 on the shaft 8. These connections for reciprocating the dividing head are also well known. The sliding head is guided in its vertical movements by the guide 37 attached to the side frames of the machine.

Figure 2:
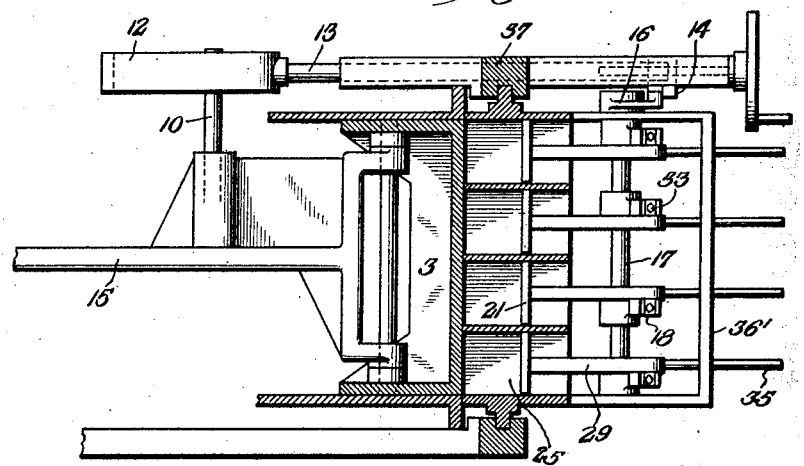
Fig. 2 is a horizontal sectional view taken through the compression box and the pockets of the divider head.
Figure 3:
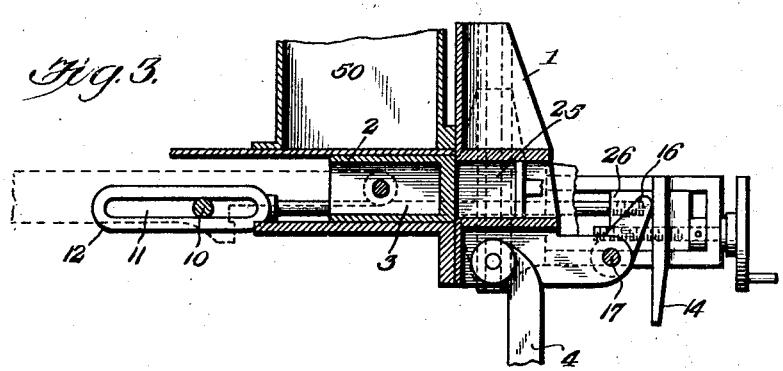
Fig. 3 is a vertical sectional view taken through the compression box and one of the pockets of the dividing head showing the parts in the position which they occupy at the time the dough has been pressed from the compression box into the pockets.
Figure 4:
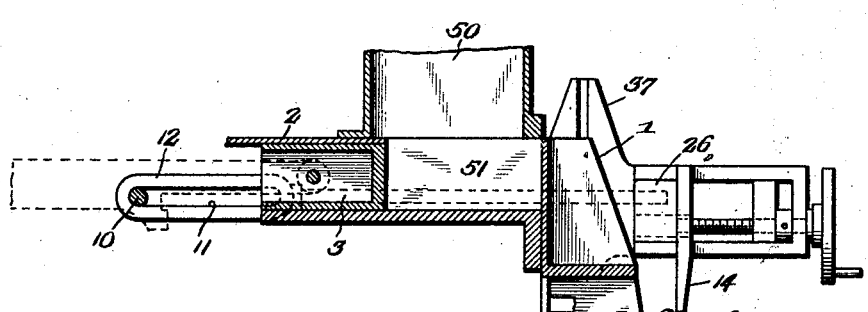
Fig. 4 is a view similar to Fig. 3 but showing the parts in the positions they occupy when the dividing head has been moved to its discharging position and the plungers have been moved to eject the dough from the pockets.

In order that the several plungers for the pockets in the dividing head may be operated in unison each plunger is attached to a rocker arm 18 mounted on the rock shaft 17 which also carries preferably at one side of the machine an arm 16 (see Figs. 2 to 4). By providing means for engaging the rocker arm 16 so as to move the same toward the shaft as viewed in Fig. 4 the shaft 17 will be rocked with the result that all of the plungers will be moved by the rocker arms 18 toward the mouth of the pocket to eject the dough therefrom as shown in Fig. 4. No driving connections are necessary for retracting the plunger as this movement may be imparted to said plungers by the dough being pressed into the pockets by the piston 3. While various forms of connections may be provided for thus actuating and moving arm 16 to eject the dough from the pockets the connections shown in the present instance consist of a pin 10 carried by the lever 15 and engaging in a slot 11 in the link 12 connected to one end of a rod 13 slidably secured at the side of the machine frame. At its opposite end rod 13 is connected to a sliding block 26 which carries a depending arm 14 adapted to engage the rocker arm 16 of the shaft 17. With these connections movement of the lever 15 and piston 3 causes the rod 13 and the depending arm 14 to be moved to the position shown in Fig. 3 so that as the dough is pressed into the pockets 25 by the piston the plungers are free to move backward or be retracted in the pockets. These movements take place, of course, while the dividing head is in its elevated position with the pockets in alinement with the compression box and after the pockets have thus been filled the cam 7 actuates lever 5 so as to depress the dividing head to the position shown in Fig. 4. After the dividing head has been lowered cam 23 causes lever 22 and lever 15 to retract the piston 3 or withdraw it from the compression box and during this retraction of said piston the pin 10 will also retract rod 13, thereby moving the depending member 14 to the left as shown in Fig. 4 with the result that the shaft 17 will be rocked by the rocker arm 16 and the rocker arms 18 to which the plungers are connected and will be turned to the left to eject the lumps of dough on the conveyor 36. After the dough has been ejected from the pockets the dividing head is again elevated and depending arm 14 moved to the right until it assumes the position shown in Fig. 3 so that the parts are again positioned to be re-charged with dough from the compression box when the piston 3 and knife 2 are again moved across the bottom of the hopper.

As has been before mentioned the dough at the sides of the compression box 51 is more compact or more compressed than it is at the center of the box so that if all the pockets 25 were of the same dimensions or depth more dough would be pressed into the side pockets than in the center pockets by the piston 3 on account of the greater density of the dough at the sides of the compression box than in the center of said box. To overcome this inequality of the quantities of dough deposited in the several pockets by the piston 3 means are provided for securing a differential retraction of the plungers 21 in said pockets.

In the present instance these means consist in having the plungers formed with elongated body portions 29 in each of which there is a slot 30. Engaging in slots of the respective plungers is a pin or trunnion 31 secured to or formed as a part of a block 32 preferably square in cross section, that is secured in a recess of similar contour in the free end of each rocker arm 18 by means of a screw 33. The pins or trunnions 31 slidably engage in the recesses 30 in the several plungers to permit adjustment of said trunnions toward and from the axis of crank shaft 17. In the present instance this adjustment of blocks 32 and trunnion 31 may be accomplished by removing screws 33 and interposing a thin plate or shim 34 between the blocks 32 and the crank arms 18. The body portions 29 of the several plungers are formed with extensions 35 that are slidably received in a cross member 36' secured to or formed as a part of the frame of the machine, these extensions 35 thus serving as guides during the movement of the plungers.

With this arrangement the distance each individual plunger is moved may be regulated at will and the distance one plunger is moved made greater or less than the distance one of the other plungers is moved. For instance, as illustrated in Fig. 5, by placing a shim between block 32 and the crank 18, an increased throw will be imparted to the plunger. On the other hand, by letting the block 32 rest directly on the crank 18 as shown in the lower view of Fig. 5, the throw imparted to the plunger will be decreased. In this way the two pockets at the sides of a four-pocket machine, at which point the dough is more compact, may be made of less depth by having the plungers retracted a less distance than in the case of the two center pockets. Consequently, the same quantity of dough, by weight, will be deposited in each and all of the pockets.

What I claim is:

1. In a dough divider, a dividing head having a series of pockets therein, a plunger slidable in each pocket, a recess in each plunger, an operating shaft, a crank for each plunger on said shaft, a pin on each crank engaging in the recess in the corresponding plunger, and means for adjusting said pins toward and from the axis of said shaft.

2. In a dough divider, a dividing head having a series of pockets therein, a slidable plunger in each pocket, an operating shaft, a crank for each plunger mounted on said shaft, a pin attached to each crank and slidably engaging the corresponding plunger, and means for adjusting said pins on the cranks toward and from the axis of the crank shaft.

3. In a dough divider, a dividing head having a series of pockets therein, a plunger slidable in each pocket, an operating shaft, a crank for each plunger mounted on said shaft, a trunnion on each crank connected to the corresponding plunger and means for adjusting said trunnions radially with respect to the axis of said shaft.

4. In a dough divider, a dividing head having a series of pockets therein, a plunger slidable in each pocket, an operating shaft, a crank for each plunger mounted on said shaft, a block secured in each crank, means for adjusting each block radially with respect to the axis of said shaft, and a trunnion on each block engaging the corresponding plunger.

5. In a dough divider, a dividing head having a series of pockets therein, a slidable plunger in each pocket, each plunger having an elongated body portion extending toward one end of said pockets with a recess therein, an operating shaft, a crank on said shaft for each plunger, a block carried by each crank, means for adjusting each block toward and from the axis of said shaft, and a trunnion on each block engaging in the recess in the body of the corresponding plunger.

FRANK H. VAN HOUTEN.